United States Patent
Zink et al.

(10) Patent No.: US 8,086,670 B1
(45) Date of Patent: Dec. 27, 2011

(54) SYSTEM AND METHODOLOGY PROVIDING OPTIMIZED DATA EXCHANGE WITH INDUSTRIAL CONTROLLER

(75) Inventors: Steven M. Zink, Hudson, OH (US); John Joseph Baier, Mentor, OH (US); Carmen D. Grissom, Jr., Brunswick, OH (US); David A. Johnston, Mentor, OH (US)

(73) Assignee: Rockwell Software Inc., West Allis, WI (US)

( * ) Notice: Subject to any disclaimer, the term of this patent is extended or adjusted under 35 U.S.C. 154(b) by 0 days.

(21) Appl. No.: 12/786,057

(22) Filed: May 24, 2010

Related U.S. Application Data

(63) Continuation of application No. 10/092,323, filed on Mar. 6, 2002, now Pat. No. 7,725,528.

(51) Int. Cl.
*G06F 15/16* (2006.01)
*G06F 15/167* (2006.01)
*G06F 7/00* (2006.01)
*G05B 19/18* (2006.01)
*G05B 15/02* (2006.01)

(52) U.S. Cl. ............ 709/203; 709/214; 709/219; 700/5; 700/9; 700/21; 707/705

(58) Field of Classification Search ............... 700/9, 21, 700/79, 96, 5; 711/156, 173; 709/214, 219, 709/203; 707/1, 705
See application file for complete search history.

(56) References Cited

U.S. PATENT DOCUMENTS

| | | | |
|---|---|---|---|
| 4,532,554 A | 7/1985 | Skala | |
| 4,908,746 A | 3/1990 | Vaughn | |
| 4,972,365 A * | 11/1990 | Dodds et al. | 710/5 |
| 5,006,820 A | 4/1991 | Prioste et al. | |
| 5,255,374 A | 10/1993 | Aldereguia et al. | |
| 5,535,335 A | 7/1996 | Cox et al. | |
| 5,748,955 A | 5/1998 | Smith | |
| 5,784,964 A | 7/1998 | Rodi | |
| 5,805,442 A | 9/1998 | Crater et al. | |
| 5,813,031 A * | 9/1998 | Chou et al. | 711/122 |
| 5,844,794 A | 12/1998 | Keeley | |
| 5,845,081 A | 12/1998 | Rangarajan et al. | |
| 5,845,149 A | 12/1998 | Husted et al. | |
| 5,873,043 A | 2/1999 | Comer | |
| 5,905,725 A | 5/1999 | Sindhu et al. | |
| 5,975,737 A | 11/1999 | Crater et al. | |
| 6,032,203 A | 2/2000 | Heidhues | |

(Continued)

*Primary Examiner* — Ramesh Patel
*Assistant Examiner* — Darrin Dunn
(74) *Attorney, Agent, or Firm* — Turocy & Watson, LLP; Alexander Kuszewski; John M. Miller

(57) ABSTRACT

The present invention relates to a system and methodology facilitating network communications between an industrial control system and a client application that interacts with a plurality of data items on the control system. The client application initiates a request or query to the industrial control system for an identification of selected data items of interest. Based on information received in the request, an aggregation component can be constructed by the client, wherein names and buffer allocations relating to the data items of interest are provided. The aggregation component is then installed by the client and updated in the industrial control system, thus providing information access to the client application when fresh or updated information is desired. Information is accessed via a communications packet that is generated from the data items identified in the aggregation component. Information transmitted to the control system can also be optimized by identifying the information via handle identifiers that are employed in place of explicit reference or tag names.

20 Claims, 10 Drawing Sheets

U.S. PATENT DOCUMENTS

| | | | |
|---|---|---|---|
| 6,097,399 A | 8/2000 | Bhatt et al. | |
| 6,104,875 A | 8/2000 | Gallagher et al. | |
| 6,120,241 A | 9/2000 | Huang et al. | |
| 6,169,927 B1 | 1/2001 | Schonthal et al. | |
| 6,201,996 B1 * | 3/2001 | Crater et al. | 700/9 |
| 6,385,169 B1 | 5/2002 | Wang | |
| 6,404,762 B1 | 6/2002 | Luzeski et al. | |
| 6,421,354 B1 | 7/2002 | Godlewski | |
| 6,480,489 B1 | 11/2002 | Muller et al. | |
| 6,546,420 B1 | 4/2003 | Lemler et al. | |
| 6,567,821 B1 | 5/2003 | Polk | |
| 6,611,739 B1 | 8/2003 | Harvey et al. | |
| 6,624,388 B1 | 9/2003 | Blankenship et al. | |
| 6,625,161 B1 | 9/2003 | Su et al. | |
| 6,639,915 B1 | 10/2003 | Tsztoo et al. | |
| 6,640,244 B1 | 10/2003 | Bowman-Amuah | |
| 6,651,110 B1 | 11/2003 | Caspers et al. | |
| 6,657,955 B1 | 12/2003 | Bonneau et al. | |
| 6,671,258 B1 | 12/2003 | Bonneau | |
| 6,699,007 B2 | 3/2004 | Huang et al. | |
| 6,724,767 B1 | 4/2004 | Chong et al. | |
| 6,728,262 B1 | 4/2004 | Woram | |
| 6,751,214 B1 | 6/2004 | Parruck et al. | |
| 6,795,814 B1 | 9/2004 | O'Neal, IV | |
| 6,801,501 B1 | 10/2004 | Knightly et al. | |
| 6,801,920 B1 | 10/2004 | Wischinski | |
| 6,865,555 B2 * | 3/2005 | Novak | 705/59 |
| 6,877,010 B2 | 4/2005 | Smith-Semedo et al. | |
| 6,882,623 B1 | 4/2005 | Goren et al. | |
| 6,889,257 B1 | 5/2005 | Patel | |
| 6,904,596 B1 | 6/2005 | Clark et al. | |
| 6,920,128 B1 | 7/2005 | Haugli et al. | |
| 6,970,921 B1 | 11/2005 | Wang et al. | |
| 2001/0056472 A1 | 12/2001 | Chafer | |
| 2002/0069102 A1 | 6/2002 | Vellante et al. | |
| 2002/0097677 A1 | 7/2002 | Hoar et al. | |
| 2002/0111895 A1 | 8/2002 | Blair | |
| 2002/0114334 A1 | 8/2002 | Yang | |
| 2002/0143901 A1 | 10/2002 | Lupo et al. | |
| 2002/0156838 A1 | 10/2002 | Batke et al. | |
| 2002/0161883 A1 | 10/2002 | Matheny et al. | |
| 2002/0184116 A1 | 12/2002 | Tam et al. | |
| 2002/0188476 A1 | 12/2002 | Bienvenu et al. | |
| 2002/0191250 A1 | 12/2002 | Graves et al. | |
| 2003/0004585 A1 | 1/2003 | Horn et al. | |
| 2003/0028889 A1 | 2/2003 | McCoskey et al. | |
| 2003/0037111 A1 | 2/2003 | Yoshioka | |
| 2003/0061533 A1 | 3/2003 | Perloff et al. | |
| 2003/0140131 A1 | 7/2003 | Chandrashekhar et al. | |
| 2003/0145039 A1 | 7/2003 | Bonney et al. | |
| 2003/0163513 A1 | 8/2003 | Schaeck et al. | |
| 2003/0165146 A1 | 9/2003 | Sultan et al. | |
| 2004/0015857 A1 * | 1/2004 | Cornelius et al. | 717/120 |
| 2004/0024891 A1 | 2/2004 | Agrusa et al. | |

* cited by examiner

SYSTEM AND METHODOLOGY PROVIDING OPTIMIZED DATA EXCHANGE WITH INDUSTRIAL CONTROLLER

CROSS REFERENCE TO RELATED APPLICATIONS

This application is a continuation of U.S. patent application Ser. No. 10/092,323, filed on Mar. 6, 2002, entitled "SYSTEM AND METHODOLODY PROVIDING OPTIMIZED DATA EXCHANGE WITH INDUSTRIAL CONTROLLER", the entirety of which is incorporated herein by reference

TECHNICAL FIELD

The present invention relates generally to industrial controllers, and more particularly to a system and methodology to facilitate optimized data transfers between an industrial controller and one or more remote client applications.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and also communicate to higher level computing systems. Industrial controllers utilize the aforementioned technologies along with other technology to control multiple applications ranging from complex and highly distributed to more traditional and repetitious applications. As an example, steel and automobile production often require control and integration with complex welding and/or robotic systems whereas, a transfer or automated assembly line can produce hundreds of thousands of similar items in a more traditional industrial control situation.

At the core of the industrial control system, is a logic processor such as a Programmable Logic Controller (PLC). Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

As can be appreciated, various remote applications often attempt to acquire PLC information or data in order to service other automation requirements. One such application includes a Human and Machine Interface (HMI) that can reside on a remote client machine to enable PLC Engineers or Operators to manipulate and/or monitor PLC control programs and associated variables, for example. Human and Machine Interfaces along with other remote applications often employ network communications and associated drivers or servers to transfer information between the application and the PLC. For example, one common network transfer protocol is referred to as Control and Information Protocol (CIP) that is an application layer protocol that can be specified for Ethernet/IP (Ethernet Industrial Protocol), as well as for ControlNet, DeviceNet and/or other protocols.

Control and Information Protocol is a message-based protocol that implements a relative path to send a message from one or more "producing" devices to one or more "consuming" devices. The producing device can include path information that directs the messages to reach the consumers. Since the producing device holds the path information, other devices along the path can simply pass the information. In traditional PLC systems, controllers poll input modules to obtain their input status. In CIP systems, digital input modules or other producers are not polled by the controller, for example. Instead, these modules produce ("multicast") associated data either upon a change of state (COS) or periodically. The frequency of update depends upon options chosen during network configuration and where on the network the input module resides. The input module, therefore, is a producer of input data and the controller and/or communications module is a consumer of the data. The PLC can also produce data for other controllers or applications to consume and/or can produce data for other modules to consume such as an output module, for example.

Presently, if remote access of a data type is requested from the PLC via a CIP or other type request for example, the requested data is placed into a communications packet having an associated overhead. The overhead includes a header and ending field, for example, that supports the protocol and encapsulates the data before being transferred to the remote application for processing. If multiple and/or unrelated data types are requested from the PLC however, respective data types can be placed in separate communications packets, wherein the associated packet includes the overhead described above. Consequently, communications efficiency can be reduced since multiple data type transfer requests between PLC's and remote applications can cause increasing amounts of network and communications overhead as the number of data requests increase.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate optimized data transfer and communications over a network between a Programmable Logic Controller (PLC) and one or more remote applications. This is achieved by installing an aggregation component in the PLC (or communications module associated with the PLC) that can dynamically buffer, pack and/or accumulate a subset of related and/or unrelated data items before transferring the data as a group or cluster to the remote application that has requested the data. As an example, a remote application such as a Human and Machine Interface (HMI) or other application installs the aggregation component in the PLC and places names or tags relating to data items of interest in the aggregation component (e.g., data that the remote application desires to process). The PLC then updates the data items associated with the tags, wherein the remote application can then read or transfer the items in a singular communications packet. In this manner, information associated with multiple data items is aggregated or accumulated within the communications packet before transfer across the network, thus mitigating the amount of overhead associated with transferring data items as individual or unrelated entities.

In accordance with one aspect of the present invention, the remote application sends a request to the PLC in order to receive and determine name or tag information associated with a plurality of data items defined in the PLC (e.g., substantially any data type, array or structure). The remote application then builds the aggregation component having selected data type names or tags that relate to application data of interest. The aggregation component can be viewed as an optimized packet having an associated buffer for accumulating information and can be implemented as an object. The optimized packet or object is then installed and instantiated on the PLC, wherein the data items identified within the object are updated by the PLC and upon request of the remote application, the data items are assembled in a communications packet and transferred according to the grouping of items defined in the object. It is noted that one or more remote applications can install optimized packets in the PLC, wherein respective applications can install a plurality of such optimized packets if desired.

Optimized packets can be dynamically configured, installed and/or removed such that if the remote application requests related data items, the related data items are packed according to a beginning address of a first item in a group, followed by a length and then followed by the values relating to the items in the group. In this manner, overhead associated with providing individual tag names for respective items in a group or category can be mitigated (e.g., identifying contiguous data items in array/buffer or other association such as a structure or union via a singular tag name associated with one or a limited number of the items in the group). Moreover, if arbitrary or predetermined limitations are placed on the amount of data that may be included in any one communications packet (e.g., limited by network protocols), then additional optimized packets can be dynamically generated and installed in the PLC to facilitate increased data transfer operations and communications. Furthermore, if the remote application reduces or changes the amount of requested data, the optimized data packets can be dynamically reduced, increased, reconfigured, and/or removed as determined by changes in the application over time.

According to another aspect of the present invention, update information or data that is sent to the PLC can be optimized before communicating the information to the PLC. This is achieved by employing data type pointers or handles rather than explicit name identifiers (e.g., ASCII tags of varying lengths that identify various data items) as part of an update header associated with an update request. For example, a remote application first requests the data types or items that are presently defined in the PLC. As part of the request, the PLC supplies explicit tag or name information for the data item, value information associated with the tag, and instance handle information relating to an address or pointer for the tag. When an update is desired, the instance handle can be employed along with an associated update value in place of the explicit tag or name information to indicate which item in the PLC is to be altered or changed. In this manner, the instance handle provides an indirect indication having fixed length (e.g., handles providing 2 byte pointer as opposed to variable length explicit tag names), thus mitigating the amount of information communicated across the network to the PLC when indicating which data item is to be altered.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology providing enhanced network communications capabilities between an industrial control system and a client application that interacts with a plurality of data items on the control system. The client application initiates a request or query to the industrial control system for an identification of selected data items of interest. Based on information received in the request, an aggregation component can be constructed by the client and/or an associated communications server, wherein names and buffer allocations relating to the data items of interest are provided. The aggregation component is then installed in/updated by the industrial control system, thus providing information access to the client application when fresh or updated information is desired. Information is accessed via a communications packet that is generated from the combination of data items identified in the aggregation component, thus mitigating overhead associated with transferring the items as smaller or discrete quantities. As will be described in more detail below, information sent to the industrial control system can be optimized by identifying the information via handle identifiers as opposed to explicit reference or tag names that may be of varying lengths.

Figure 1:
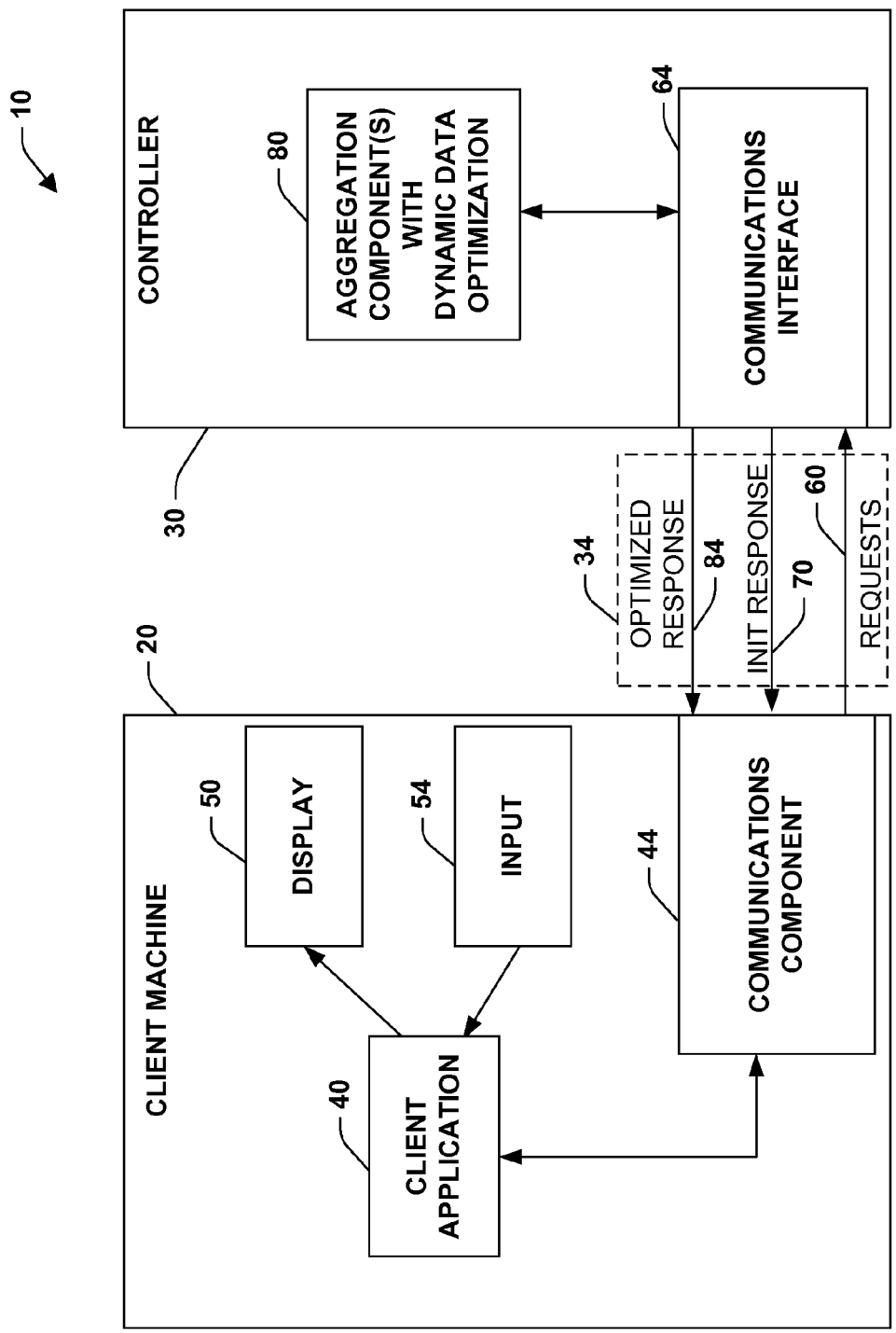
FIG. 1 is a schematic block diagram illustrating an industrial controller and communications architecture in accordance with an aspect of the present invention.

Referring initially to FIG. 1, an industrial control and communications architecture 10 is illustrated in accordance with an aspect of the present invention. A client machine 20 interfaces to an industrial controller 30 via a network 34 (e.g., Ethernet, DeviceNet, ControlNet). It is also noted that other type communications can be achieved between the client machine 20 and the controller 30 (e.g., RS-232, 422, and 485). The client machine 20 includes a client application 40 that employs a communications component 44 to exchange information with the industrial controller 30 across the network 34. As an example, the client application 40 can include a Human and Machine Interface (HMI) that interfaces to an operator via a graphical display 50 and one or more inputs 54. It is to be appreciated that the client application 40 can be substantially any type of application that transmits and receives data from the industrial controller 30 (e.g., a second industrial controller or communications module executing the client application and communications component, data logging or monitoring applications).

The display 50 can be employed to provide feedback and output data to a user regarding various aspects of communications, preferences, configurations and/or adjustments relating to the controller 30. The display 50 can include display objects (e.g., icons, buttons, sliders, input boxes, selection options, menus, tabs and so forth) having multiple dimensions, shapes, colors, text, data and sounds to facilitate optimal interactions with the controller 30. In addition, various menus and alternative screens or display outputs can be provided that perform a plurality of aspects of the present invention, wherein the inputs 54 can be employed for adjusting and configuring the menus and screens. This can include receiving user commands from a mouse, keyboard, speech input and/or other device to effect operations of the client application 40 and controller 30.

According to one aspect of the present invention, the client application 40 determines that one or more data items of interest are to be retrieved from the industrial controller 30. For example, a user may request via the input 54 and associated menu that a plurality of related or unrelated data items of interest are to be presented to the display 50 in order to provide status or other information regarding the controller 30. Based on the user's request, the client application 40 can initiate a data transfer via the communications component 44, wherein a request 60 is generated that specifies the data items of interest and sent to the controller 30. The request 60 is processed by a communications interface 64 on the controller 30, whereby an initial response 70 is generated and transmitted back to the communications component 44. The initial response 70 includes tag, address, pointer and/or name information relating to controller memory locations (described below) for associated data items of interest that was initially requested by the client application 40.

Based upon the response 70 and the associated tag information, the client application 40 and/or the communications component 44, builds and subsequently installs one or more aggregation components 80 in the controller 30 that can be employed as a data communications buffer for the requested data items. The aggregation component 80 is periodically updated by the controller 30 in accordance with data values associated with the data items of interest specified therein. According to subsequent requests for data from the communications component 44, an optimized response 84 can be generated by the communications interface 64 on the controller that includes substantially all or significant portions of the contents of the aggregation component 80. Thus, a plurality of data items that are requested by the client application 40 can be aggregated, transmitted and provided in a substantially larger or singular communications packet (e.g., via a network signal or data packet). In this manner, communications performance can be enhanced since overhead associated with transmitting data items as individual packets is mitigated (e.g., mitigating repeated and redundant header and ending data that is generally associated with a network communications packet). As will be described in more detail below, the aggregation components 80 can be dynamically added or removed depending on the amount of data requested by the client application 40. In addition, respective aggregation components 80 can be increased or decreased in size (e.g., buffer elements added or removed) depending on increased or decreased data demands from the client application 40.

Figure 2:
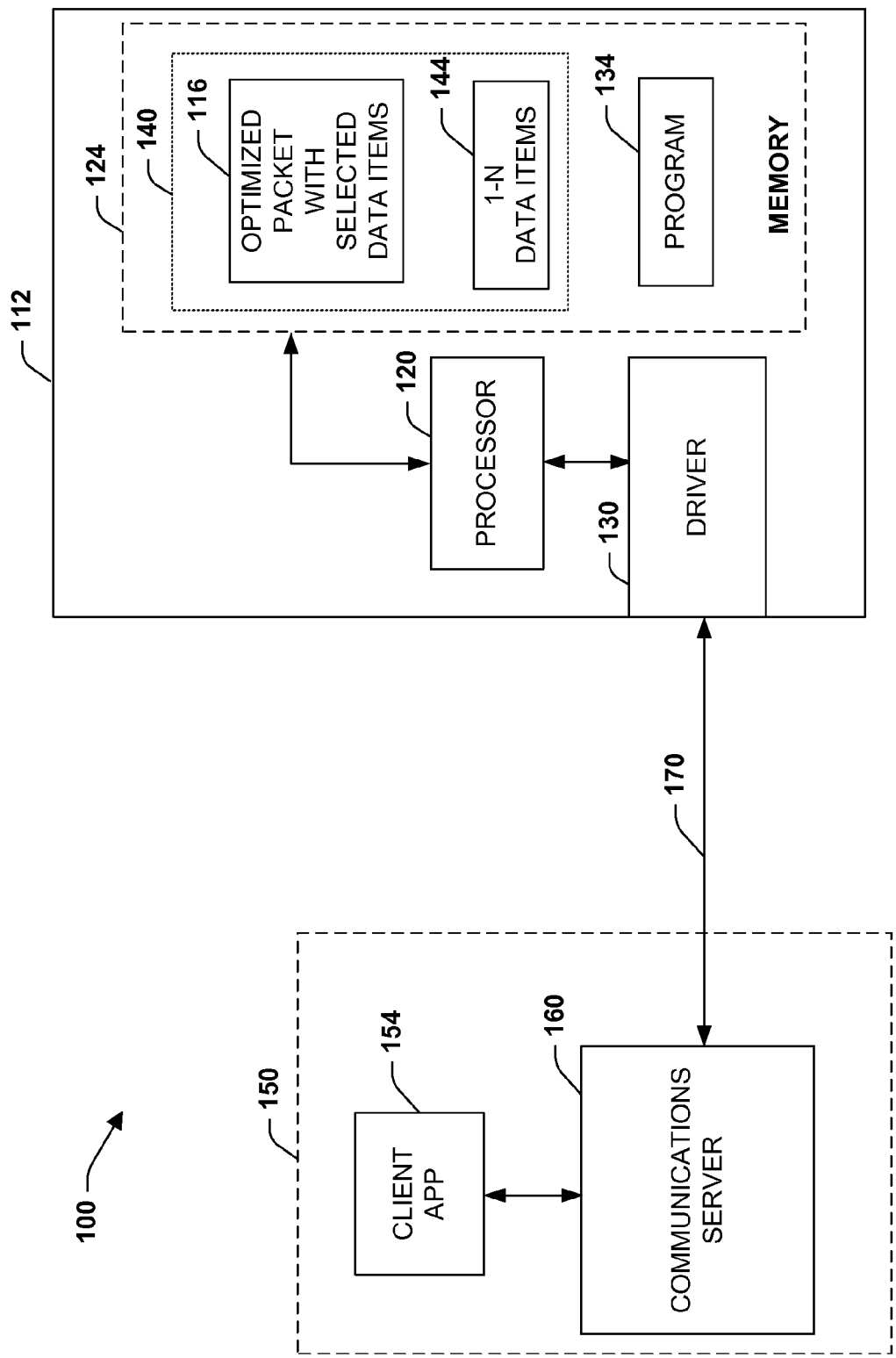
FIG. 2 is a schematic block diagram illustrating an industrial controller and associated optimized packet in accordance with an aspect of the present invention.

Referring now to FIG. 2, a system 100 illustrates an industrial controller 112 and associated optimized packet 116 in accordance with an aspect of the present invention. The industrial controller 112 includes a processor 120 that interacts with a memory 124 and a communications driver 130. The memory 124 includes program memory 134 adapted to operate the controller 112 and variable memory 140 having one to N data items 144 that are associated with the optimized packet 116, N being an integer. A client 150 includes a client application 154 that interacts with a communications server 160. The client application 154 is employed to request one or more of the data items 144 from the variable memory 140 via the communications server 160 and a network 170. The client application 154 determines a desired amount of data items 144 to be retrieved from the controller 112.

Based upon the determination, a request is generated to the communications server 160 and sent to the communications driver 130. The request is provided to the processor 120 and causes the processor to access the variable memory 140 for one or more of the requested data items 144. As an example, the processor 120 may have access to one or more megabytes of variable memory 140, wherein 250 bytes are requested from the data items 144. The processor 120 locates tag information relating to the requested data items 144 and provides the tag information to the communications driver 130 that is then transmitted to the communications server 160 as a response. According to the tag information in the driver response, the client application 154 and/or communications server 160 construct and install the optimized packet 116 via the communications driver 134 and processor 120. The optimized packet is thus configured as a portion, subset or selection of the data items 144.

According to periodic intervals such as a real time interrupt, the processor 120 can access the data items 144 and update/refresh the optimized packet 116 according to the data items that are selected and specified within the packet. It is noted that the optimized packet 116 can also be updated according to asynchronous communications requests from the communications server 160. When the client application 154 determines that updated or refreshed data is desired, a data request can be generated to the communications server 160 and sent to the communications driver 130. The data request causes the processor 120 to copy the specific items requested from the optimized packet 116 into a buffer (not shown) accessible by the communications driver 130, wherein an aggregated communications packet is constructed and transmitted as a response to the data request. In this manner, a plurality of related or unrelated (not in contiguous memory portions or of the same data type) data items can be transmitted in a singular communications packet, thereby mitigating overhead associated with transmitting these items according to individual data item requests.

Figure 3:
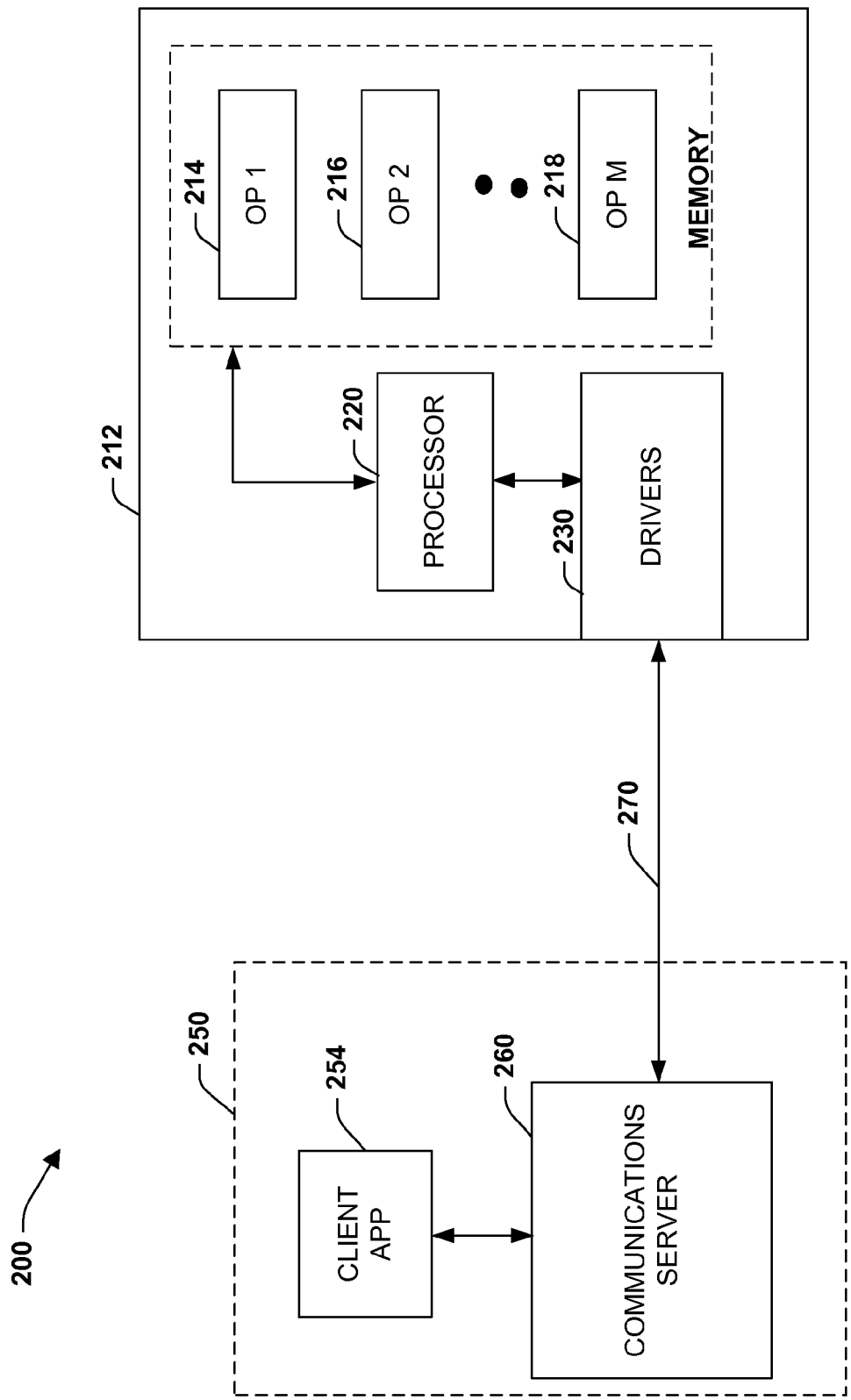
FIG. 3 is a schematic block diagram illustrating an industrial controller having one or more optimized packets in accordance with an aspect of the present invention.

Turning to FIG. 3, a system 200 illustrates an industrial controller 212 having one or more optimized packets 214 through 218 in accordance with an aspect of the present invention. The system 200 illustrates the dynamic aspects of the present invention. For example, if a client application 254 were adapted to request optimized packets that were greater in size than supported by a selected network communications protocol, additional optimized packets 214-218 can be constructed and installed on the controller 212. As an example, if existing network protocol supports 500 bytes or other amount per communications packet, and 1200 bytes of data were requested, then three optimized packets 214-218 can be constructed and installed on the controller 212 to support the request according to this particular example.

In accordance with the dynamic aspects of the present invention, if additional data were requested (e.g., an additional 1000 bytes above 1200 bytes), then additional optimized packets 214-218 can be added to support the increased data demand. Likewise, if the client application 254 were to reduce requested data demands, optimized packets 214-218 can be removed from the controller 212 via an associated request from the client application 254 and associated communications server 260.

In accordance with another aspect of the present invention, data within an optimized packet 214-218 can be dynamically adjusted. For example, if the optimized packet 214 were initially configured to transmit a certain amount of data (e.g., 750 bytes of data initially specified), and over a period of time, more or less than the initially specified amount of data were actually requested by the client application 254, then the optimized packet 214 can be reconfigured according to the changed or varying amount of requested data. Thus, communications packets can be dynamically tailored and optimized within a respective packet according to the actual amount of data requested by the client application 254 in order to mitigate transmission of superfluous or un-requested data across the network 270.

Figure 4:
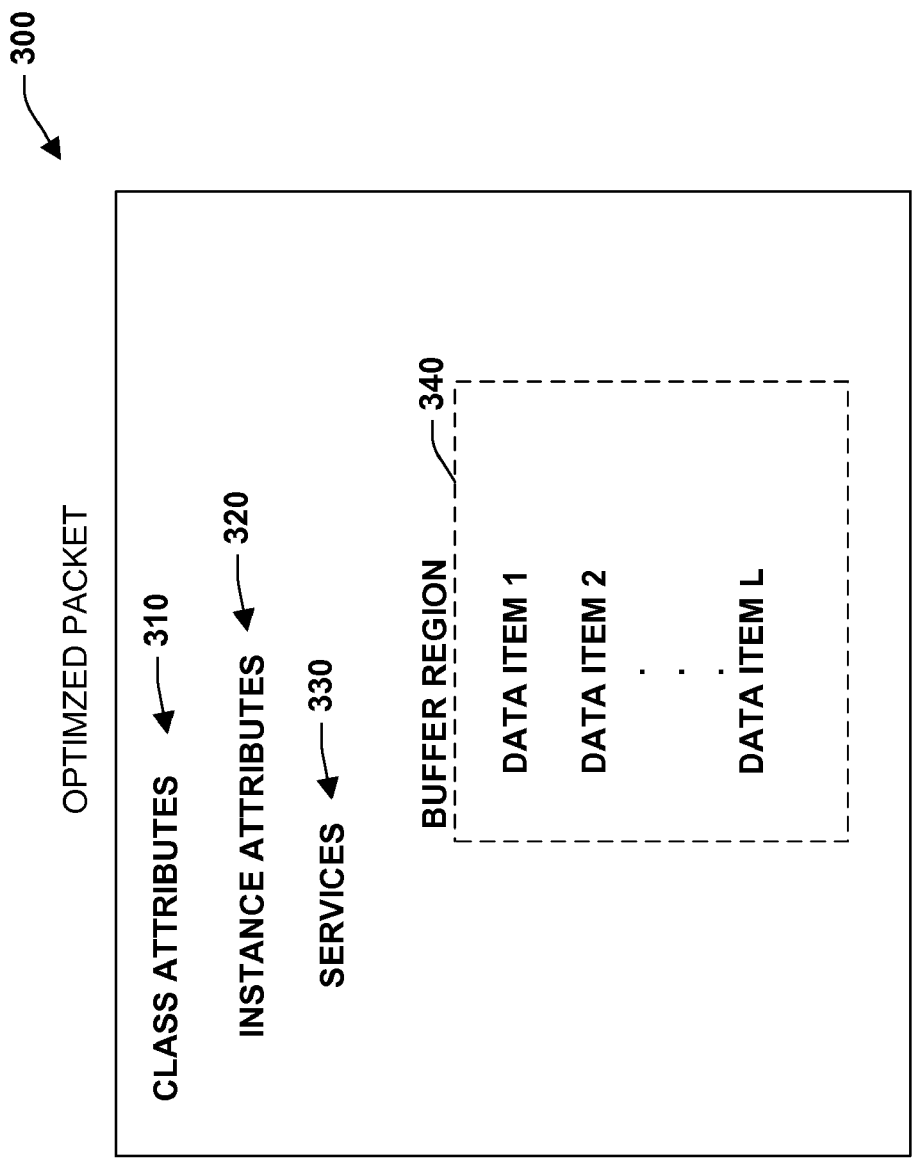
FIG. 4 is a diagram illustrating an exemplary optimized packet in accordance with an aspect of the present invention.

FIG. 4 is a diagram illustrating an exemplary optimized packet 300 in accordance with an aspect of the present invention. The optimized packet 300 can be configured as an object in the controller having associated class attributes 310, instance attributes 320, services 330, and a buffer region 340.

The class attributes 310 can supply information such as revision level information of the object, an instance number, and the number of instances of an associated class. Exemplary class attributes 310 are illustrated below in Example 1.

Example 1

| Class Attributes for Optimized Packet Object | | | | | |
|---|---|---|---|---|---|
| Number | Access Rule | Name | ASA Data Type | Description of Attribute | Semantics of Values |
| 1 | Generally Required | Get | Revision | UINT | Revision of object class definition | This is revision 1 |
| 2 | Generally Required | Get | Maximum Instance | UDINT | Maximum object instance created | The instance number of the highest object instance |
| 3 | Generally Required | Get | Number of Instances | UDINT | Count of the number of object instances created | How many instances do we have |

Instance attributes 320 include such aspects as object update times, event triggers, whether to update the object based on rate or demand or other criteria, where in the data stream triggers are located, whether to continue on an overflow, number of trending drivers currently installed, timestamp information, size of buffers, start times, an object lifetime settings. An exemplary listing of instance attributes 320 is illustrated below in Example 2.

Example 2

| Instance Attributes for Optimized Packet Object | | | | | |
|---|---|---|---|---|---|
| Number | Access Rule | Name | ASA Data Type | Description of Attribute | Semantics of Values |
| 1 | Generally Required | Set | Rate | UDINT | Time in microseconds of sample period | Milliseconds is a possible period 10 ms default |
| 2 | Generally Required | Set | Event | struct{ UINT UDINT } | Which event is this trend object attached to | class code (motion or task) instance number |
| 3 | Generally Required | Set | Sample Type | USINT | Indicates whether to use rate, event, on demand or something else | 1 = Periodic (Default) 2 = Synch Event 3 = On Demand |
| 4 | Generally Required | Set | Trigger % | USINT | Indicates where in data stream the trigger point will be | Continuous values 0-100% |
| 5 | Generally Required | Set | Overflow config | BOOL | Stop or continue on overflow | Default is stop |
| 6 | Generally Required | Get | Trending Drivers | UINT | Number of trending drivers currently running in this object | |
| 7 | Generally Required | Set | Time accuracy | USINT | Shift of timestamp difference for delta | default of 7 bits 128 usec for periodic or event, 0 bits for on demand |

-continued

Instance Attributes for Optimized Packet Object

| Number | Access Rule | Name | ASA Data Type | Description of Attribute | Semantics of Values |
|---|---|---|---|---|---|
| 8 | Generally Required | Get | Buffer Size | UDINT | Size of buffers in 32 bit words | Default size is 4K words for periodic or event and 0 for on demand |
| 9 | Generally Required | Get | Time Stamp | ULINT | Start time recorded after start service Or create time | |
| 10 | Generally Required | Set | Persistence | BOOL | Indicates whether the trend will delete on connection loss or close | 0 - default delete itself |

Object Services 330 include such services as Get All Attributes, Get All List, Set Attributes List, Reset, Start, Stop, Create Object and Delete Object and are described in more detail below in Example 3.

Example 3

Services for Optimized Packet Object

| Service Code | Class | Instance | Service Name | Description of Service |
|---|---|---|---|---|
| 01 | n/a | Generally Required | Get All Attributes | Gets all of the instance attributes listed above |
| 03 | Generally Required | Generally Required | Get Attributes List | Gets the specified attributes of the class or the instance |
| 04 | n/a | Generally Required | Set Attributes List | Sets the specified attributes of the instance |
| 05 | n/a | Generally Required | Reset | Clears data buffers and sets object to a stopped state waiting for configuration |
| 06 | n/a | Generally Required | Start | Starts recording |
| 07 | n/a | Generally Required | Stop | Stops trending/ histogramming |
| 08 | Generally Required | Optional | Create Object | Allocates memory space to store the object, The object is generally empty at this time. |
| 09 | n/a | Generally Required | Delete Object | Deletes the specified trending object |

The buffer region 340 includes 1 to L data items, L being an integer. The data items can be configured in substantially any manner. For example, this can include bit, byte, 16 bit, 32 bit or greater word configurations, unsigned or signed integer or floating point elements, and single or multiple dimension array configurations to name but a few examples.

Figure 5:
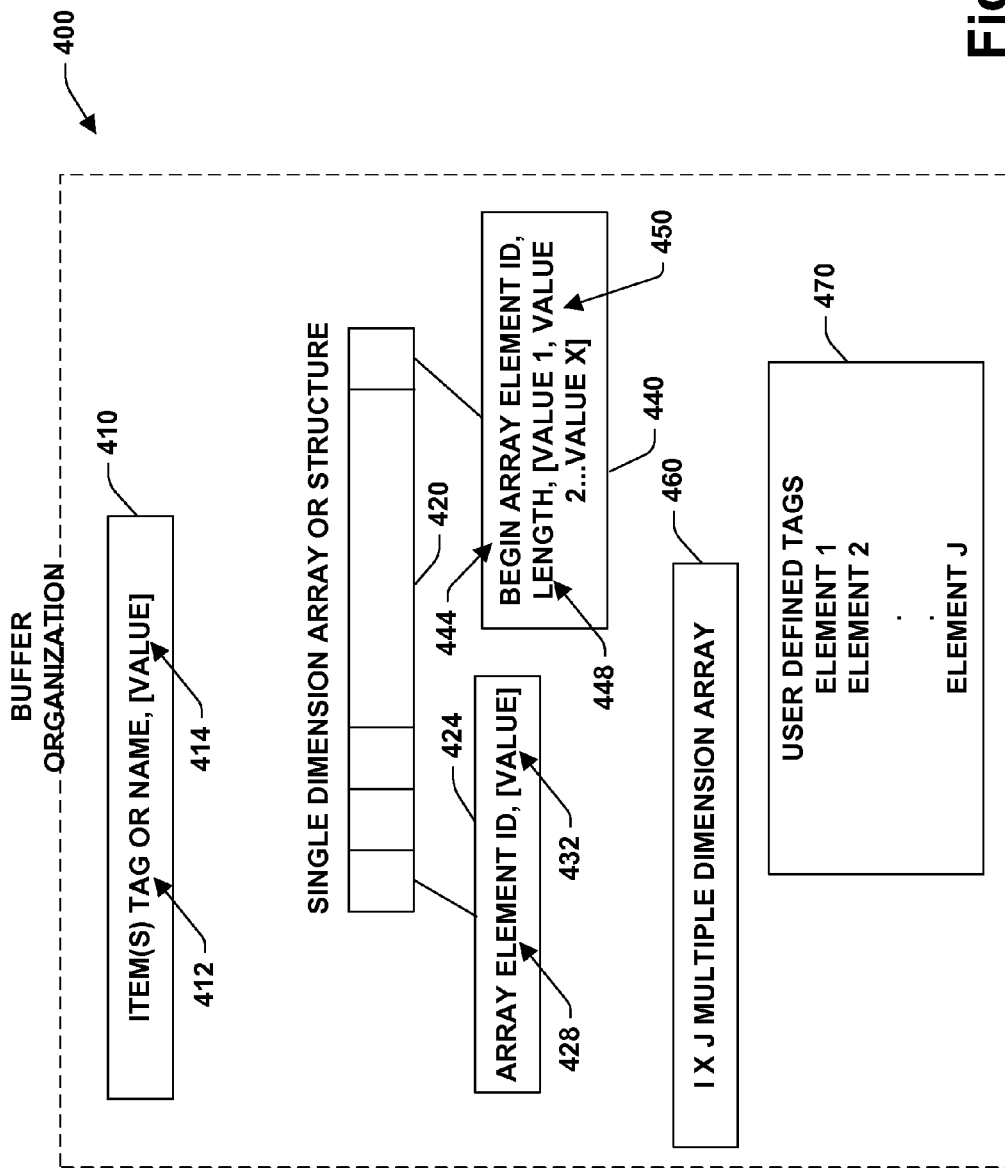
FIG. 5 is a diagram illustrating a possible buffer configuration in accordance with an aspect of the present invention.

To further illustrate the buffer region 340, FIG. 5 illustrates a possible buffer configuration or organization 400 in accordance with an aspect of the present invention. At 410, a single buffer element is illustrated. The buffer element 410 includes a tag or name 412 to identify the element 410 and includes a value field 414 that indicates the data contents or numeric value of the buffer element 410. At 420, a single dimension array or memory structure is illustrated (e.g., 100 element contiguous buffer). The array 420 can include elements 424 that have an associated array element ID 428, and array element value 432. In addition, contiguous data items or types can be identified as depicted at 440 having an associated begin array element ID 444, a length value 448, indicating the length of contiguous array elements, and associated data values 1 through X 450, X being an integer. Moreover, in addition to the possible structures described above, a multiple dimension array 460 can also be provided in the buffer region 400. This can include an I×J array having I rows and J columns, wherein I and J are integers, respectively.

Another type structure relates to one or more user defined tags 470 having 1 to J defined elements, J being an integer. The user defined tag (UDT) 470 can consist of different types of elements (e.g., SINT, INT, DINT, REAL) and/or other complex structures such as Timers, Counters, Arrays and/or other user defined tags. The communications server described above optimizes reading of the UDT 470 by requesting a blob (Binary Large Object) of data consisting of the elements defined in the UDT, and then parsing out the desired items or elements of interest from the blob for the client application. The request for UDT elements can include a first element in the UDT followed by a length specifier to indicate how many bytes of data to read.

FIGS. 6, 7, 8 and 10 illustrate methodologies to facilitate optimized data communications with an industrial controller in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
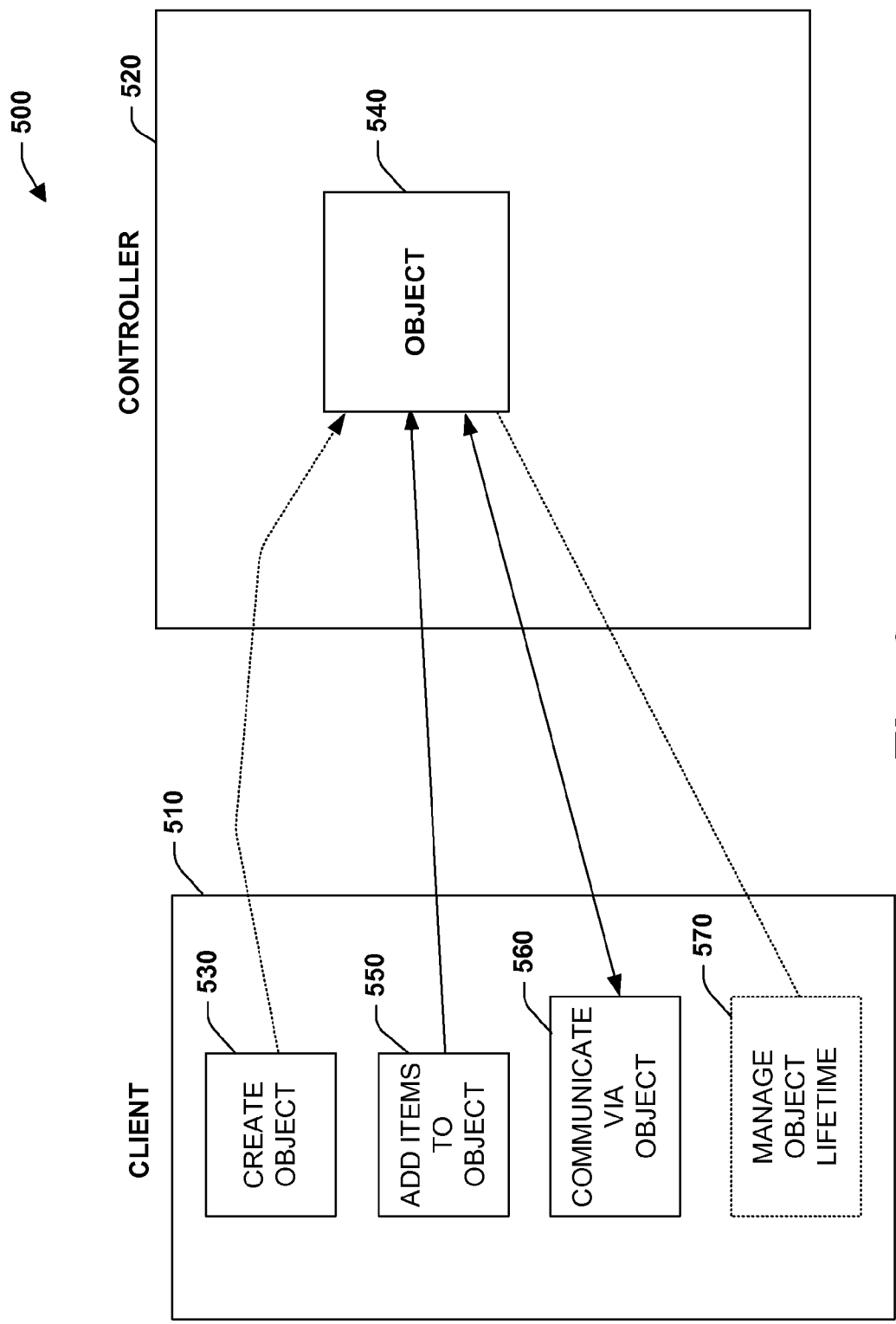
FIG. 6 is a diagram illustrating remote object creation and communications in accordance with an aspect of the present invention.

Referring to FIG. 6, a diagram 500 illustrates remote object creation and management in accordance with an aspect of the present invention. According to this aspect of the present invention, a remote client 510 interacts with an industrial controller 520 over a network connection. At 530, an object is created on the client and installed on the controller at 540. At 550, data items of interest are added to the object at 540. This can include a plurality of contiguous or non-contiguous address memory locations and can include various types of data (e.g., bit, byte, word, signed, unsigned, floating point, integer, array, structure, UDT and so forth). At 560, the client 510 communicates via the object 540 to receive updated data for the selected data items of interest. As described above, the controller 520 can update the data items within the object 540 via a periodic occurrence, an event driven occurrence, and/or based upon a demand or request from the client 510. At 570, object lifetime is managed. This can include removing the object 540 from the controller 520 when the client 510 no longer requests the data items of interest. In addition, object lifetime can be terminated based upon an event such as a reference counter being decremented to zero. Furthermore, the object 540 or objects if more than one object is installed can be removed by the controller 520 if network connections are disrupted for a time period that is greater than a predetermined amount of time. The timeout period can be configured at the client 510 and passed to the controller 520 when a connection request is initiated (e.g., parameter instructing controller to remove object if network communications lost for more than 10 seconds).

Figure 7:
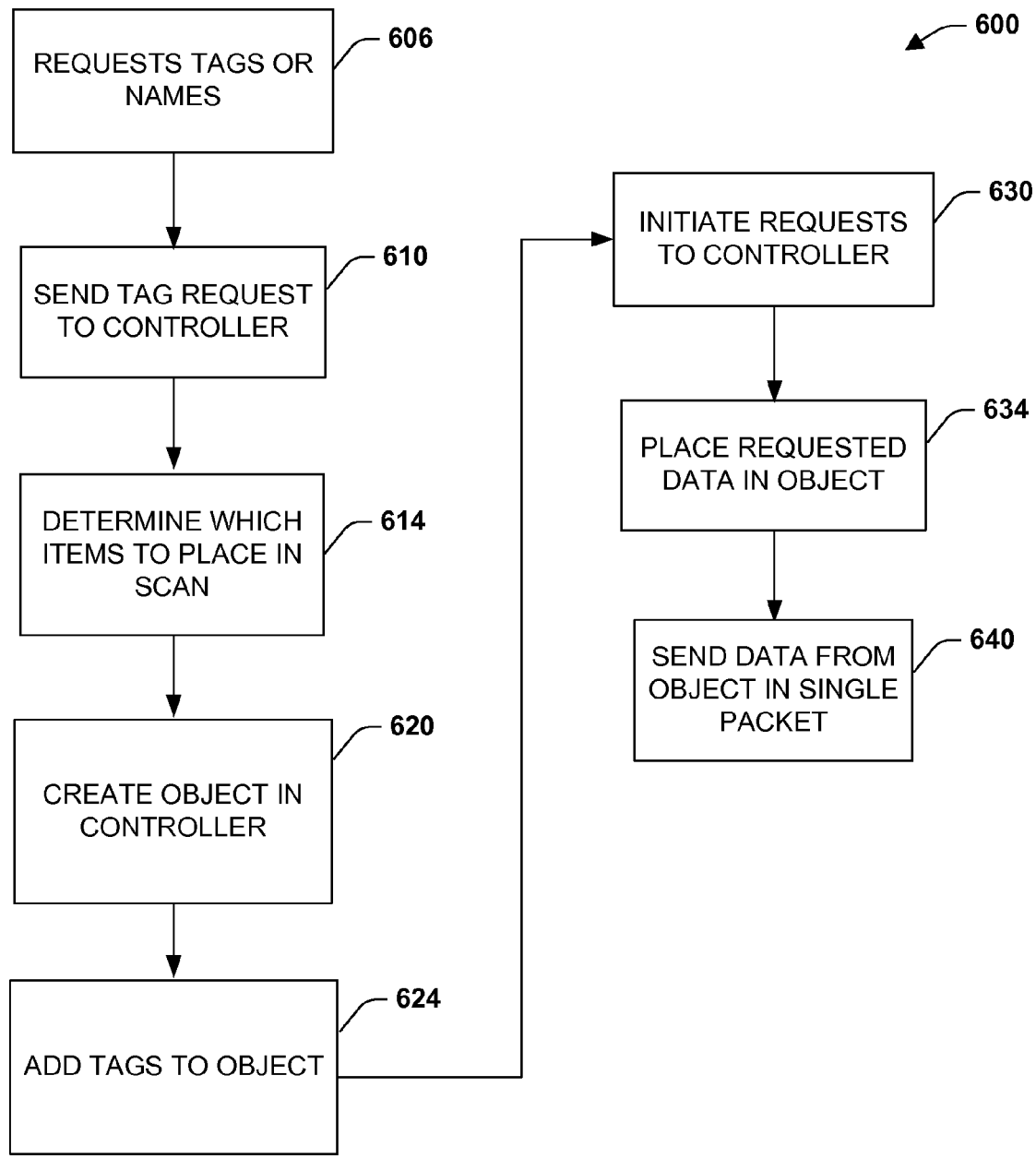
FIG. 7 is a flow diagram illustrating a methodology providing optimized data communications in accordance with an aspect of the present invention.

FIG. 7 is a flow diagram illustrating a methodology 600 that provides optimized data communications with an industrial controller in accordance with an aspect of the present invention. At 606, tag or name information relating to data items of interest is requested by a client application. At 610, the tag request is sent to an industrial controller. At 614, a determination is made as to which data items of interest are to be placed in a scanning list. The list indicates which data items are to be periodically updated for the client application. At 620, an object is created in the controller. At 624, tags relating to the data items of interest are placed into the object created at 620. At 630, data requests are initiated to the controller. At 634, the requested data is placed into the object created at 620. At 640, the data from the object is transmitted in the form of an aggregated data packet that encapsulates the data contents of the object. If multiple objects have been created on the controller, additional communications or data packets can be sent to the client application to service the request for controller data.

Figure 8:
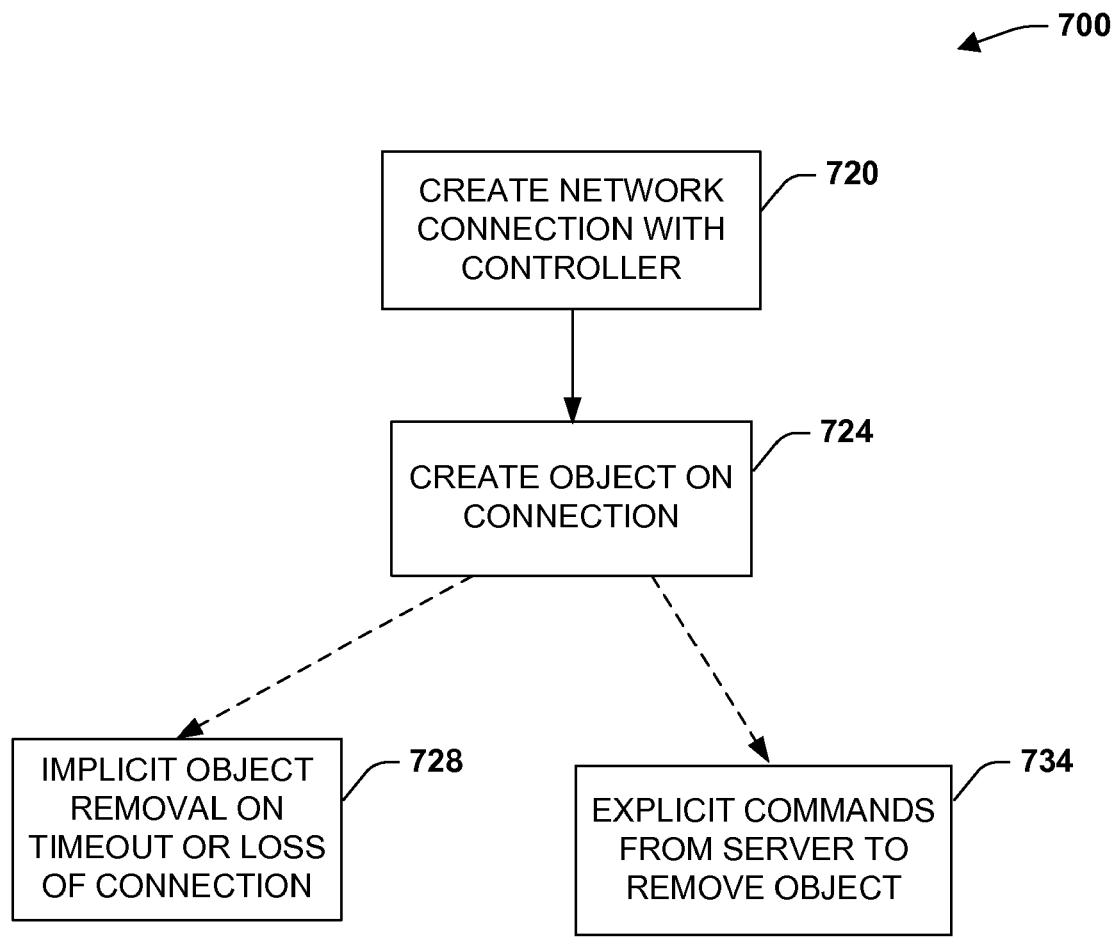
FIG. 8 is a flow diagram illustrating a methodology for object lifetime management in accordance with an aspect of the present invention.

FIG. 8 is a flow diagram illustrating a methodology 700 for object lifetime management in accordance with an aspect of the present invention. Proceeding to 720, a network connection is created between a controller and a client server communications component. For example, a socket connection or secure socket connection can be created between the controller and the client. At 724, an object is created on and/or across the connection established at 720. At 728, objects can be removed from service on the controller implicitly. For example, this can include such conditions or implicit determinations as a timeout of communications over the socket or a detected loss of connection between the controller and client (e.g., status bit indicating physical or logical communications connection has failed or been disabled). At 734, explicit commands from the communications server on the client can cause the object created at 720 to be removed. For example, if a client application were to change display screens whereby the object data was no longer being requested, then the object can be removed from the controller based upon a remove or terminate object command transmitted to the controller from the communications server.

Figure 9:
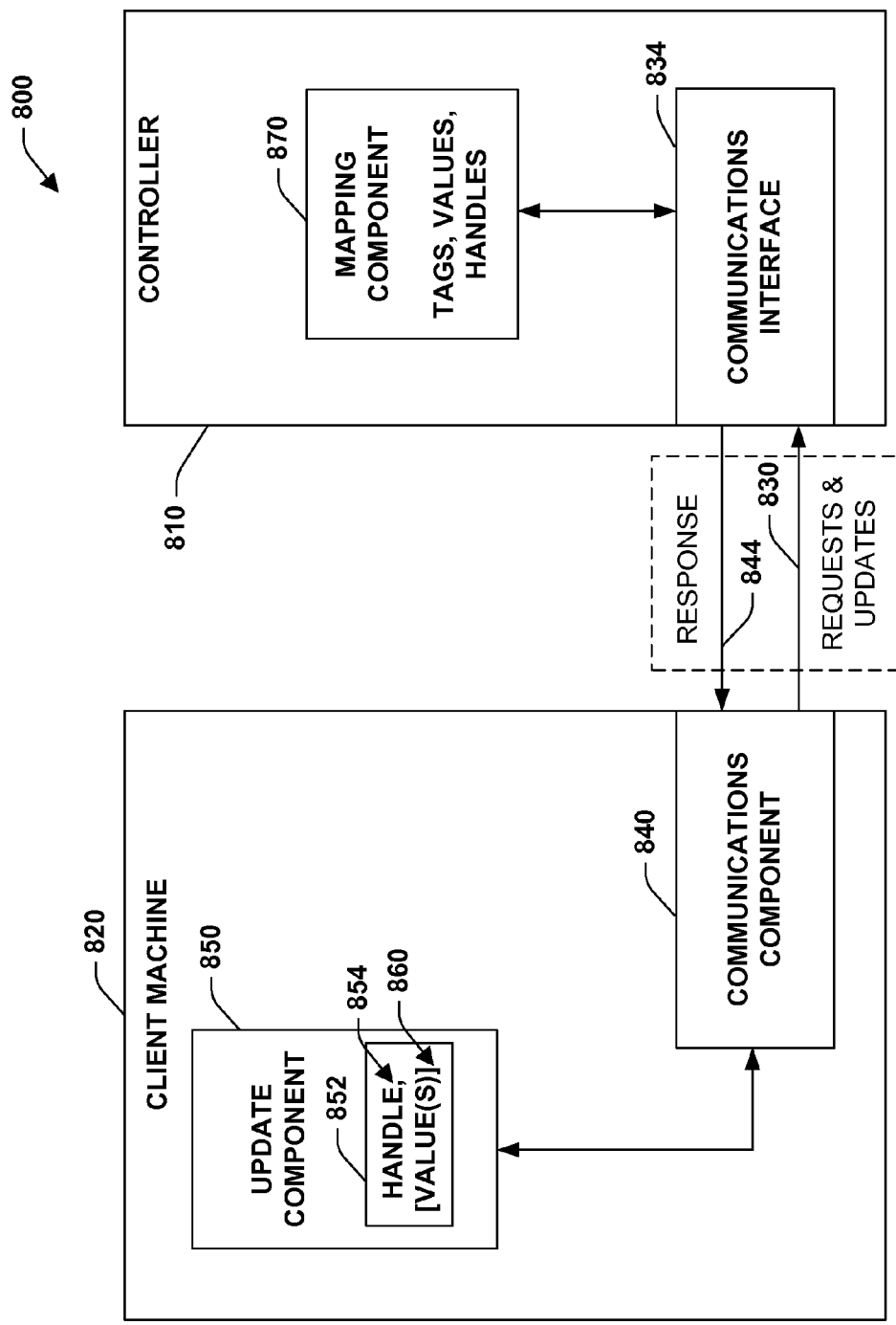
FIG. 9 is a schematic block diagram illustrating an industrial controller and optimized update packets in accordance with an aspect of the present invention.

Referring now to FIG. 9, a system 800 illustrates an industrial controller 810 and optimized update packets in accordance with an aspect of the present invention. In this aspect of the present invention, a client machine 820 sends or transmits updated or new data to the controller 810. The client 820 first sends a data update request 830 to a communications interface 834 on the controller 820 via a communications component 840. A response 844 to the request 830 is provided by the controller 820, wherein tag, value and handle information relating to one or more data items of interest is provided in the response. The handle information is similar to a pointer or an indirect address indication of the location of the requested data item in the controller 810.

When the client machine 820 or related application determines that a data update is to be transmitted to the controller 810, an update component 850 employs the handle information received in the response 844 to build an update packet 852 having a handle field 854 and an associated value 860. The update packet 852 is transmitted to the controller 810, wherein a mapping component 870 employs the handle field 854 to place or locate the value 860 at the address pointed to by the handle 854. By employing the handle 854 in place of explicit tag references to place or locate updated data in the controller 810, network bandwidth can be conserved. This can be achieved since explicit tags are often lengthy and consist of variable lengths thus causing variable and often larger amounts of data to be transmitted. The handle 854 can be employed as a consistent one or two byte data reference (or other consistent amount) that generally tends to mitigate the overall amount of data to be transmitted when compared to explicit tag references.

Figure 10:
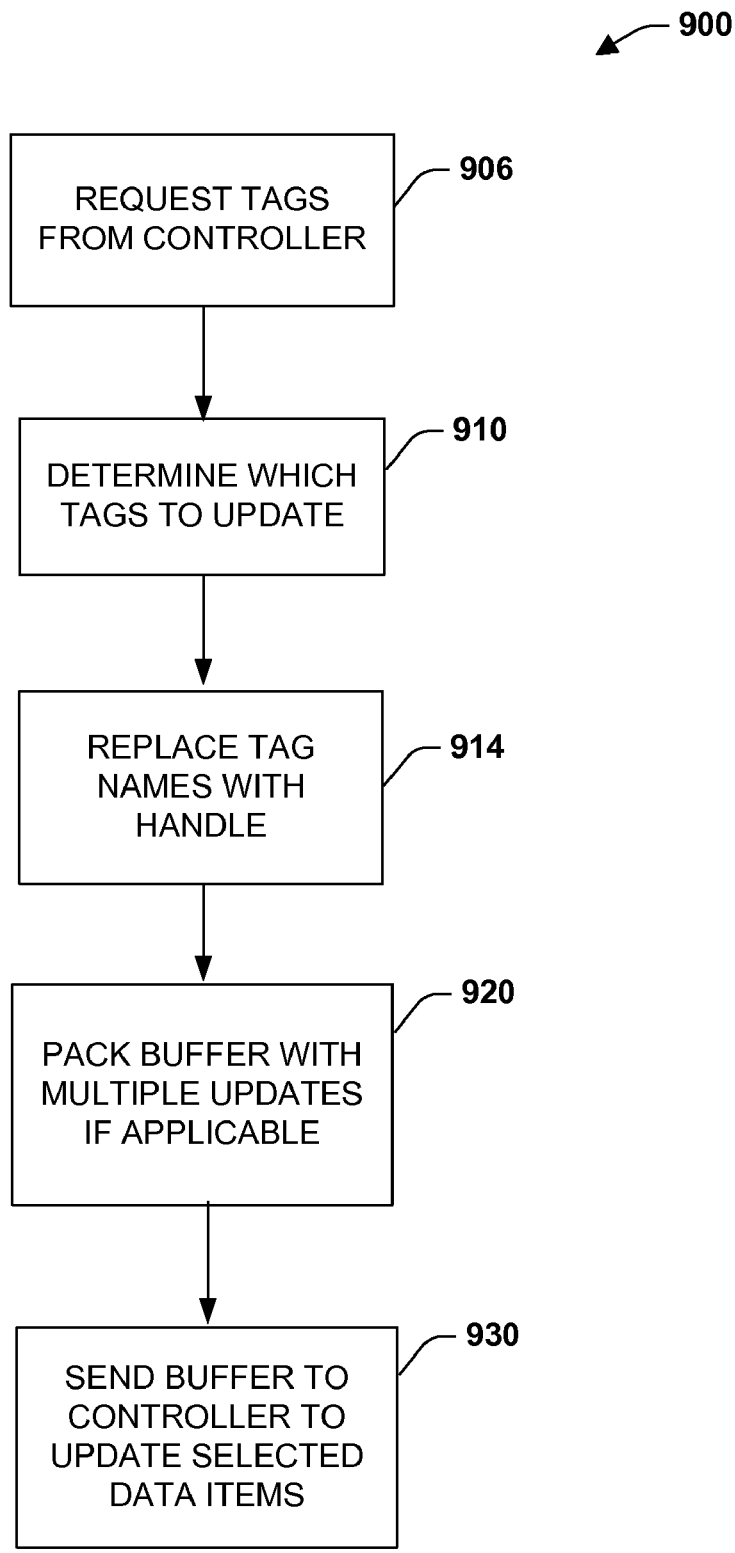
FIG. 10 is a flow diagram illustrating a methodology providing write optimization to an industrial controller in accordance with an aspect of the present invention.

Turning to FIG. 10, a flow diagram illustrates a methodology 900 providing data write optimization to an industrial controller in accordance with an aspect of the present invention. At 906, one or more tags are requested from a controller. At 910, a determination is made as to which tags requested at 906 are to be updated. At 914, the tag names of data items to be updated are replaced with handle identifiers. At 920, if multiple data items are to be updated, a buffer can be packed having the multiple items and associated handles. If contiguous memory items or locations are to be updated, a beginning handle can be specified, along with an associated length field and respective values relating to the specified length to further conserve the amount of data and network information to transmit. At 930, the data packets created at 914 and/or 920 are transmitted to the controller to cause an update or refresh of the selected data items.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial controller for use in an industrial control system, the control system having one or more clients configured to send queries to the controller via a network, the controller comprising:

a processor; a memory communicatively coupled to said processor and configured to store an industrial control program, the program having a plurality of data items associated with the industrial control system, the memory being further configured to store at least one of names or tags, the at least one of names or tags being related to said data items; and a communications interface configured to:

receive from a client a query of the at least one of names or tags; provide to the client the at least one of names or tags; receive from a client a quantity of aggregation components that are configured to aggregate data items related to at least a subset of the at least one of names or tags in said memory, wherein an aggregation component is configured to aggregate data items associated with the aggregation component into a single communications packet, wherein the quantity is selected for transmission of a minimum number of communications packets based upon an amount of the data items related to the at least a subset of the at least one of names or tags in said memory and a data limit per communications packet; and transmit one or more communications packet that encapsulates the data items with related to the at least a subset of the at least one of names or tags.

2. The controller of claim 1, wherein the data items comprise input data associated with an input module, the input module being configured to interface at a device level with an industrial device.

3. The controller of claim 2, wherein the data items comprise output data associated with at least one of another controller or an output module, the output module being configured to interface at a device level with an industrial device.

4. The controller of claim 3, wherein the data items further comprise input data associated with an input module that interfaces at a device level with an industrial device.

5. The controller of claim 1, wherein the aggregation component is a data object having a data buffer, the data buffer comprising at least a subset of the data items, and wherein the aggregated data packet comprises a length and the data items in the data buffer.

6. The controller of claim 1, wherein the communications interface is further configured to receive a command from the client to remove the aggregation component from the controller.

7. The controller of claim 1, wherein the communications interface is further configured to receive a second aggregation component from a client.

8. The controller of claim 1, wherein the industrial controller is configured to remove an aggregation component on loss of connection with a client greater than a predetermined amount of time.

9. A method to facilitate data communications in an industrial control network, comprising:
   storing an industrial control program in a memory of an industrial controller, the industrial control program having associated data items;
   storing in the memory of the industrial controller at least one of names, tags or handles that correspond to the data items;
   installing in the industrial controller a quantity of aggregation components that are configured to aggregate data items related to at least a subset of the at least one of names or tags in said memory, wherein an aggregation component is configured to aggregate data items associated with the aggregation component into a single communications packet, wherein the quantity is selected for transmission of a minimum number of communications packets based upon an amount of the data items related to the at least a subset of the at least one of names or tags in said memory and a data limit per communications packet; and
   aggregating the data items into one or more communications packet.

10. The method of claim 9, further comprising communicating the one or more communications packet to a client via the industrial control network.

11. The method of claim 9, wherein an aggregation component is a data object stored in the memory of the industrial controller.

12. The method of claim 9, further comprising installing one or more additional aggregation components to the industrial controller based upon an increase in the amount of the data items related to the at least a subset of the at least one of names or tags in said memory.

13. The method of claim 9, further comprising removing one or more aggregation components from the industrial controller based upon a decrease in the amount of the data items related to the at least a subset of the at least one of names or tags in said memory.

14. The method of claim 9, wherein the data items comprise output data associated with at least one of another controller or an output module, the output module being configured to interface at a device level with an industrial device.

15. The method of claim 14, wherein the data items further comprise input data associated with an input module that interfaces at a device level with an industrial device.

16. A non-transitory computer readable medium having computer executable instructions stored thereon to facilitate data communications in an industrial control network, comprising:
   storing an industrial control program in a memory of an industrial controller, the industrial control program having associated data items;
   storing in the memory of the industrial controller at least one of names, tags, or handles that correspond to the data items;
   installing in the industrial controller a quantity of aggregation components that are configured to aggregate data items related to at least a subset of the at least one of names or tags in said memory, wherein an aggregation component is further configured to aggregate data items associated with the aggregation component into a single communications packet, wherein the quantity is selected for transmission of a minimum number of communications packets based upon an amount of the data items related to the at least a subset of the at least one of names or tags in said memory and a data limit per communications packet; and
   aggregating the data items into one or more communications packet.

17. The non-transitory computer readable medium of claim 16, further comprising communicating the one or more communications packet to a client via the industrial control network.

18. The non-transitory computer readable medium of claim 16, wherein an aggregation component is a data object stored in the memory of the industrial controller.

19. The non-transitory computer readable medium of claim 18, further comprising installing one or more additional aggregation components to the industrial controller based upon an increase in the amount of the data items related to the at least a subset of the at least one of names or tags in said memory.

20. The non-transitory computer readable medium of claim 16, further comprising removing one or more aggregation components from the industrial controller based upon a decrease in the amount of the data items related to the at least a subset of the at least one of names or tags in said memory.

* * * * *